United States Patent [19]

Corbier

[11] 4,343,232
[45] Aug. 10, 1982

[54] COFFEE MAKER

[75] Inventor: Wierd Corbier, Groningen, Netherlands

[73] Assignee: U.S. Philips Corporation, New York, N.Y.

[21] Appl. No.: 202,036

[22] Filed: Oct. 29, 1980

[30] Foreign Application Priority Data

Nov. 15, 1979 [NL] Netherlands .......................... 7908339

[51] Int. Cl.³ ............................................. A47J 31/06
[52] U.S. Cl. .......................................... 99/299; 99/295
[58] Field of Search ................ 99/295, 299, 300, 301, 99/302 R, 304, 305, 306, 307

[56] References Cited

U.S. PATENT DOCUMENTS

| | | | |
|---|---|---|---|
| 1,226,552 | 5/1917 | Rey | 99/299 |
| 1,962,493 | 6/1934 | Ferris | 99/299 |
| 3,333,527 | 8/1967 | Bender | 99/299 |

FOREIGN PATENT DOCUMENTS 2809520  9/1978  Fed. Rep. of Germany ........ 99/295

Primary Examiner—Robert W. Jenkins
Attorney, Agent, or Firm—Thomas A. Briody; William J. Streeter; Rolf E. Schneider

[57] ABSTRACT

There is provided a coffee maker including a housing and a filtering assembly removably suspendible in the housing. The filtering assembly comprises a filter vessel and a surrounding filter-vessel holder, the respective bottoms of each being provided with an outlet and being spaced from each other. An upright partition on the filter-vessel holder bottom divides such space into a discharge section and a drip reservoir. An upright pin extends from the filter-vessel holder bottom for engagement with the filter vessel outlet. The filter vessel and the filter-vessel holder are rotatable with respect to each other to vary the position of the upright pin for control of the rate of coffee flow through the discharge section and also alternatively to position the filter vessel outlet over the drip reservoir.

3 Claims, 9 Drawing Figures

COFFEE MAKER

This invention relates to a coffee maker having a housing in which a filtering device can be placed, which filtering device comprises a filter vessel with one or more outlet openings in the bottom thereof and underneath it an adjusting element with one or more outlet openings, the rate of discharge of the coffee from the filtering device being adjustable with the aid of the filter vessel and the adjusting element, which are adjustable relative to each other.

A filtering device for such a coffee maker is known from published Netherlands Patent Application 7706110.

In coffee makers, especially in the larger types, the temperature of the coffee is lower when making small amounts of coffee than when making large amounts of coffee. This is undesirable and can be solved by reducing the rate of discharge of the coffee from the filtering device when small amounts of coffee are to be made. It is therefore desirable to make the rate of discharge of the coffee adjustable. For this purpose various constructions of filtering devices are known.

A problem with coffee makers is that after the coffee has been made coffee keeps dripping from the filtering device for some time, which gives rise to soiling after the coffee jug has been removed. Coffee makers are known where a receptacle for receiving drops of coffee can be placed underneath the filter vessel after the coffee has been made. Furthermore, coffee makers are known in which after the coffee has been made the discharge opening of the filter vessel is fully closed.

It is an object of the present invention to provide a filtering device in which by means of a simple construction both the rate of discharge of the coffee from the filtering device is adjustable and soiling as a result of dripping of residual coffee is avoided.

The coffee maker with a filtering device in accordance with the invention is therefore characterized in that the adjusting element is provided with a reservoir, the filter vessel and the adjusting element being adjustable relative to each other into a dripping position in which the outlet opening(s) of the filter vessel is (are) situated above the reservoir of the adjusting element.

A preferred embodiment of the coffee maker, in which one outlet opening is formed in the bottom of the filter vessel, is characterized in that the adjusting element is constituted by a filter-vessel holder, which surrounds the filter vessel, an upright partition being arranged on the bottom of the filter-vessel holder, which partition divides the lower part of the filter-vessel holder into a drip reservoir and a discharge section, on the bottom of which an upright pin is arranged, the filter vessel and the filter-vessel holder being adjustable relative to each other into a first position in which the upright pin partly closes the outlet opening of the filter vessel and into a second position in which the pin leaves such outlet opening entirely free.

In accordance with a further embodiment of the coffee maker the filtering device can be latched in the drip position with the aid of latching means in the housing of the coffee maker.

Suitably, the filter-vessel holder can be suspended in the coffee maker housing, the filter vessel is arranged so as to be rotatable in the filter-vessel holder and the latching means is constituted by a hook and a pin, the filter vessel being provided with the hook and the housing of the coffee maker with the pin, the pin engaging behind the hook in the drip position.

The invention also relates to a filtering device for use in conjunction with such coffee maker.

The invention will now be described in more detail with reference to the accompanying drawings, in which.

Figure 1:
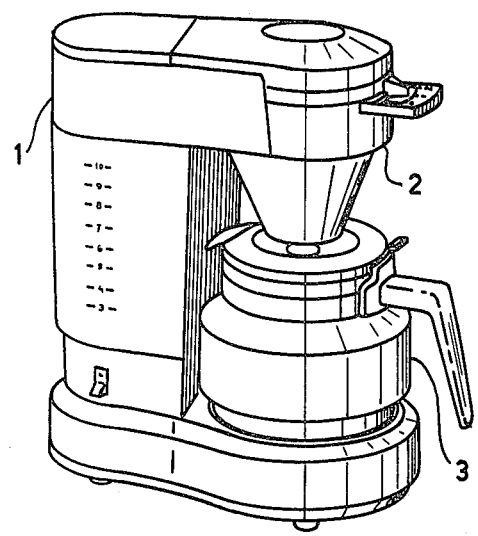
FIG. 1 is a perspective view of a coffee maker with a filtering device.
Figure 2:
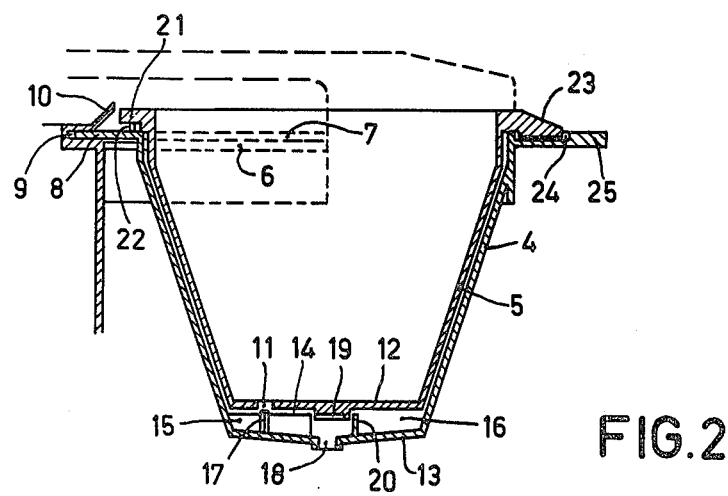
FIG. 2 is a cross-sectional view of the filtering device suspended in the housing of the coffee maker of FIG. 1.
Figure 3:
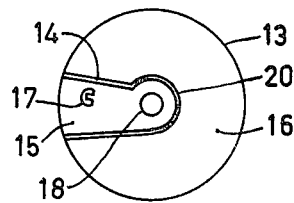
FIG. 3 is a plan view of the bottom of the filter vessel holder of the filtering device of FIG. 2.
Figure 4:
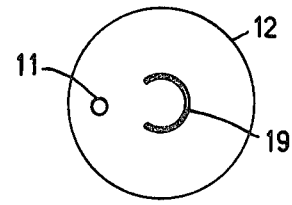
FIG. 4 is a view from the underside of the bottom of the filter vessel of the filtering device of FIG. 2.

In FIG. 1 the reference numeral 1 designates the housing of the coffee maker, in which a filtering device 2 and a coffee jug 3 can be placed. The filtering device or assembly, as shown in FIG. 2, comprises a filter-vessel holder 4 and a filter vessel 5, which is arranged so as to be rotatable in the filter-vessel holder. In the filter vessel 5 a paper filter can be placed. The filtering device can be suspended in the housing 1 of the coffee maker. For this purpose the housing is formed with a semicircular supporting rim 6. The filter vessel holder 4 bears with the rim 7 on the supporting rim 6 of the housing. In order to prevent toppling of the filtering device, the filter-vessel holder 4 is provided with a tab 8, which engages with a slot 9 of the housing 1. In order to facilitate insertion of the filtering device the housing is furthermore provided with an upwardly sloping tab 10.

In accordance with the invention the filtering device both enables the rate of discharge of the coffee to be adjusted and residual drops of coffee to be caught. For this purpose the filter vessel 5 has an outlet opening 11, which is formed eccentrically in its bottom 12. Underneath it, on the bottom 13 of the filter-vessel holder 4 an upright partition 14 is arranged, which divides the lower part of the filter-vessel holder 4 into a discharge section 15 and a drip reservoir 16. On the obttom of the discharge section 15 an upright pin 17 is mounted. Moreover, an outlet opening 18 is formed in the discharge section. On the underside of the bottom 12 of the filter-vessel 5 a centring rim 19 is arranged. A portion 20 of the upright partition 14 is circular. The centring rim 19 engages with the circular portion 20 in such a way that the filter vessel is readily rotatable in the filter-vessel holder.

Figure 5:
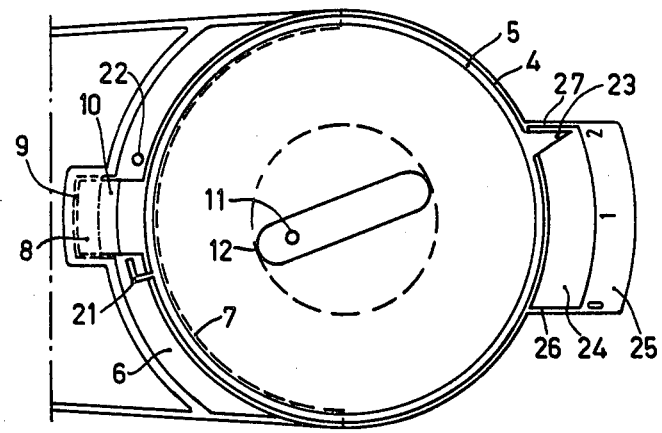
FIGS. 5 and 6 shows views from the top of the filtering device of FIG. 2 in two different positions.
Figure 7:
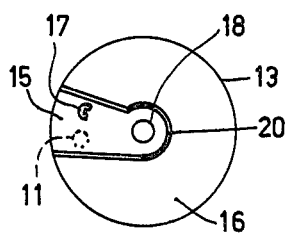
FIGS. 7 and 8 and 9 show plan views of the bottom of the filter vessel holder in three difference positions.

The filtering device has three positions and operates as follows:

In position 2 (see FIGS. 5 and 7) the outlet opening 11 of the filter vessel is situated over the discharge section 15 of the filter vessel holder 4, but adjacent the pin 17. In this position the coffee flows through the openings 11 and 18 into the coffee jug 3 at a normal rate.

Figure 8:
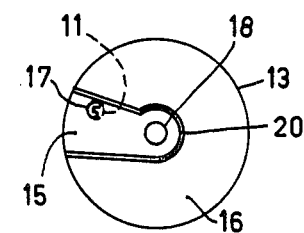

In position 1 (see FIG. 8) the outlet opening 11 is situated exactly above the pin 17, so that the outlet opening 11 is partly closed. The rate of discharge of the coffee in this position is smaller than in position 2 and thus suitable for making small amounts of coffee. Position 1 is also the position in which the filtering device of FIG. 2 is shown.

Figure 6:
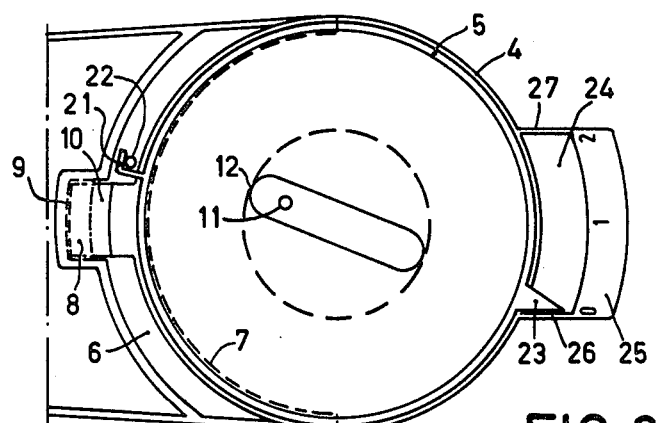
Figure 9:
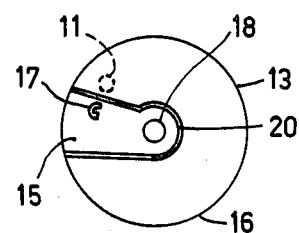

In position 0 (see FIGS. 6 and 9) the outlet opening 11 is situated over the drip reservoir 16. After the coffee has been made and before the coffee jug 3 is removed, the filter vessel is set to position 0. This prevents residual coffee drops from soiling for example a hotplate.

In order to prevent, when the coffee jug is removed in the drip position 0, the filtering device is pulled out of the housijng 1 by the coffee jug, the filtering device being latched in the drip position. For this purpose the filter vessel 5 is formed with a hook 21 and a pin 22 is formed on the supporting rim 6 of the housing 1. In the drip position 0 the hook 21 engages behind the pin 22, so that the fitlering device cannot be removed from the housing.

The filter vessel 5 can be rotated by means of a knob 23, which also serves as a position indicator.

The angle through which the filter vessel is rotatable in the filter vessel holder is limited in that the knob 23 partly engages with a recess 24 of the grip 25 of the filter-vessel holder 4. The edges 26 and 27 act as stops for the rotation of the knob 23.

The filter vessel and the filter-vessel holder can readily be disassembled for cleaning purposes.

What is claimed is:

1. A coffee maker including a housing and a filtering assembly removably suspendible in the housing; said filtering assembly comprising a filter vessel provided with an outlet opening in its bottom, a filter-vessel holder surrounding the filter vessel and provided with an outlet opening in its bottom, the filter vessel bottom being spaced from the filter-vessel holder bottom, an upright partition arranged on the bottom of the filter-vessel holder and dividing the space between the filter vessel bottom and the filter-vessel holder bottom into a discharge section and a drip reservoir, an upright pin extending from the filter-vessel holder bottom for engagement with the outlet opening of the filter vessel, and means to rotate the filter vessel and the filter-vessel holder with respect to each other to vary the position of the upright pin for control of the rate of flow of coffee through the discharge section and also alternatively to position the filter vessel outlet opening over the drip reservoir.

2. A coffee maker according to claim 1, which includes means to latch the filtering assembly in the drip position.

3. A coffee maker according to claim 2, in which the latching means comprises a hook and a pin for engagement with each other in the drip position.

* * * * *